United States Patent
Gou et al.

(10) Patent No.: US 6,353,651 B1
(45) Date of Patent: Mar. 5, 2002

(54) CORE CATCHER COOLING BY HEAT PIPE

(75) Inventors: Perng-Fei Gou, Saratoga; Craig Delany Sawyer, Los Gatos; Hubert Allen Upton, Morgan Hill; Shyam Satinder Khorana, San Jose, all of CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/441,830

(22) Filed: Nov. 17, 1999

(51) Int. Cl.$^7$ .............................................. G21C 9/016
(52) U.S. Cl. ...................... 376/280; 376/282; 376/283; 376/287; 376/288
(58) Field of Search ................................ 376/280, 282, 376/283, 287, 288

(56) References Cited

U.S. PATENT DOCUMENTS

| | | | | |
|---|---|---|---|---|
| 3,607,630 A | * | 9/1971 | West et al. .................. | 376/280 |
| 5,301,215 A | * | 4/1994 | Gou et al. .................... | 376/283 |
| 5,410,577 A | * | 4/1995 | Forsberg et al. ............. | 376/280 |
| 5,511,102 A | * | 4/1996 | Gluntz ......................... | 376/283 |
| 5,684,848 A | * | 11/1997 | Gou et al. .................... | 376/367 |

FOREIGN PATENT DOCUMENTS

| | | | | |
|---|---|---|---|---|
| EP | 0390486 A2 | * | 3/1990 | ........... G21C/15/18 |
| JP | 6-222177 | * | 6/1994 | ........... G21C/9/016 |

* cited by examiner

Primary Examiner—Michael J. Carone
Assistant Examiner—John Richardson
(74) Attorney, Agent, or Firm—Armstrong Teasdale LLP

(57) ABSTRACT

A heat removal system for the under reactor pressure vessel area of a boiling water nuclear reactor system that provides both protection of the containment boundary from attack by molten core debris and cools the molten core debris to prevent a breach of the containment boundary in the unlikely event of a severe accident where the molten core penetrates the lower head of the reactor vessel is described. The heat removal system includes a glass matrix slab positioned adjacent the floor of the containment and a plurality of heat tubes at least partially embedded in the glass matrix slab and extending into the area under the nuclear reactor pressure vessel. The cooling system also includes a passive containment cooling system, and fused vent pipes connecting the suppression pool with the drywell.

24 Claims, 2 Drawing Sheets

CORE CATCHER COOLING BY HEAT PIPE

BACKGROUND OF THE INVENTION

This invention relates generally to nuclear reactors and more particularly to a heat removal system for the under vessel area of a nuclear reactor.

One known boiling water nuclear reactor includes a reactor pressure vessel (RPV) positioned in a drywell, or containment, and a passive cooling containment system (PCCS). The RPV contains a core, and the containment is designed to withstand pressure generated by the RPV and the core during operation. The PCCS is configured to limit the pressure within the containment to a pressure below a design pressure of the containment and to keep the RPV core substantially cool.

Typically the floor of the containment vessel rests on the reactor building basemat. The basemat may rest on bedrock and typically supports the reactor building and the internal components of the reactor. In the event of a severe accident in which the molten core is postulated to penetrate the lower head of the reactor, the molten core would flow into the under reactor pressure vessel area and begin to attack the floor of the containment vessel and eventually breach the containment boundary.

There are several known methods of protecting the containment floor from the attack of the molten core debris. However, these methods do not include cooling the molten core debris and only prolong the length of time before the molten core debris breaches the containment boundary.

It would be desirable to provide protection for the containment of a nuclear reactor from attack by molten core debris in the unlikely event of a severe accident where the molten core penetrates the lower head of the reactor vessel. It is further desirable to provide protection for the containment that includes cooling the molten core debris to prevent a breach of the containment boundary.

BRIEF SUMMARY OF THE INVENTION

A heat removal system for the under reactor pressure vessel area of a boiling water nuclear reactor provides both protection of the containment boundary from attack by molten core debris and cools the molten core debris to prevent a breach of the containment boundary in the unlikely event of a severe accident where the molten core penetrates the lower head of the reactor vessel. In an exemplary embodiment, the heat removal system includes a glass matrix slab positioned adjacent the floor of the containment and a plurality of heat tubes at least partially embedded in the glass matrix slab and extending into the area under the nuclear reactor pressure vessel. The cooling system also includes fused vent pipes connecting the suppression pool, located in the wetwell, with the drywell, and a passive containment cooling system.

Each heat tube includes an evaporator portion and condenser portion. Each evaporator portion includes a cylindrical evaporator tube and each condenser portion includes a cylindrical condenser tube. Header pipes connect a plurality of evaporator tubes to a plurality of condenser tubes so that the evaporator tubes are in flow communication with the condenser tubes.

At least a portion of each evaporator tube is positioned parallel to the containment floor and embedded in the glass matrix slab. One end of each evaporator tube extends through the glass matrix slab into the drywell area below the reactor vessel and couples with a header pipe.

In the unlikely event of a severe accident where the molten core penetrates the lower head of the reactor vessel, the molten core debris will fall onto the glass matrix slab. The glass matrix slab softens and the uranium and fission products mix with the glass matrix. Because of increased heat in the drywell, the fusible valves open to permit water to flow through the vent pipes from the suppression pool to partially fill the drywell and overlie the condenser tubes. The evaporator tubes embedded in the glass matrix transfer heat from the glass matrix slab to the condenser tubes which then release the heat to the water overlying the condenser tubes. The PCCS removes heat from the interior of the containment and releases the heat to the environment outside the reactor building. As the containment temperature decreases, the glass matrix slab re-solidifies, thus maintaining the integrity of the containment boundary.

The glass matrix slab of the above described heat removal system provides protection for the containment of a nuclear reactor from attack by molten core debris in the unlikely event of a severe accident where the molten core penetrates the lower head of the reactor vessel. Also, the heat tubes and PCCS further provide protection for the containment by cooling the molten core debris to prevent a breach of the containment boundary.

DETAILED DESCRIPTION OF THE INVENTION

Figure 1:
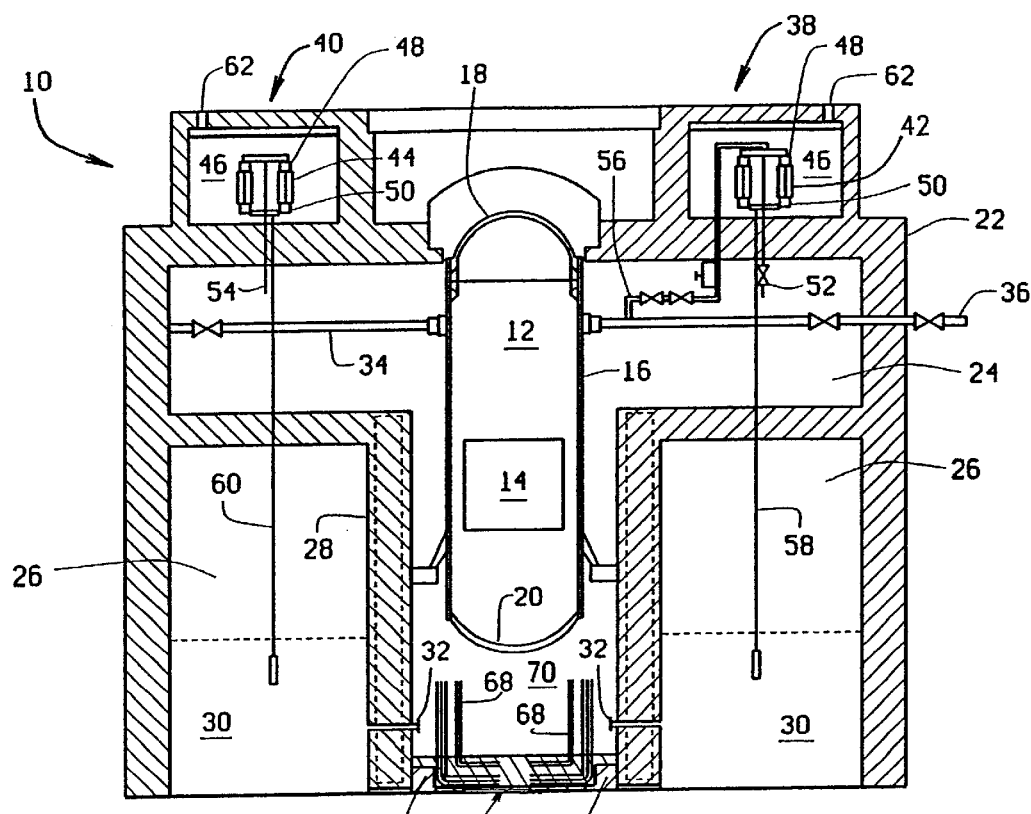
FIG. 1 is a schematic of a nuclear reactor system in accordance with an embodiment of the present invention.

FIG. 1 is a schematic depiction of a nuclear reactor system 10 in accordance with one embodiment of the present invention. Nuclear reactor system 10 includes a cylindrical reactor pressure vessel 12 (RPV) which encloses a reactor core 14. RPV 12 includes a cylindrical wall 16 sealed at one end by a bottom head 20 and at the other end by a top head 18. RPV 12 is housed in a primary containment vessel 22 (PCV). Primary containment vessel 22 includes a drywell 24 and a wetwell 26. In one embodiment, drywell 24 is a concrete cylinder with a domed top, and wetwell 26 is an annular chamber formed by a wall 28 and primary containment vessel 22. A suppression pool of water 30 is located in wetwell 26, and RPV 12 is located in drywell 24. Connection between drywell 24 and wetwell 26 is provided by a plurality of fusible valves 32 in the lower part of drywell wall 28. Valves 32 are fusible, and remain closed until the temperature in drywell 24 exceeds a predetermined temperature. At the predetermined temperature, valves 32 open to permit water to flow from suppression pool 30 into drywell 24. Additionally, a feedwater line 34 supplies water to RPV 12, and a steam line 36 carries steam away from RPV 12.

Also shown in FIG. 1 are two passive containment cooling systems 38 and 40, sometimes referred to herein as PCCS 38 and 40. PCCS 38 and 40 include condensers, or heat exchangers, 42 and 44 that condense steam and transfer heat to water in a large condenser pool 46 which is vented to the atmosphere. Each condenser 42 and 44 is submerged in a respective compartment of condenser pool 46 located high in the reactor building at approximately the same elevation as the fuel pools. Condenser pool 46 is above and outside of PCV 22.

Each condenser 42 and 44 is coupled to an upper drum 48 and a lower drum 50. Steam enters PCCS 38 and 40 through lines, or flowpaths, 52 and 54 respectively. A steam-gas mixture may also enter PCCS 38 through line, or flowpath, 56 from RPV 12. The steam is condensed in condensers 42 and 44 and falls to lower drum 50. From lower drum 50, the steam condensate and the noncondensable gases can be drained and vented through lines 58 and 60 having outlets which are submerged in suppression pool 30.

Heat from PCCS 38 and 40 causes condenser pool 46 temperature to rise to a point where the condenser pool water will boil. Condenser pool water can heat up to about 101° C. (214° F.). The steam which is formed, being nonradioactive and having a slight positive pressure relative to station ambient pressure, is vented from the steam space above each PCCS 38 and 40 to outside the reactor building via discharge vents 62. A moisture separator may be installed at the entrance to discharge vents 62 to preclude excessive moisture carryover and loss of condenser pool water.

Nuclear reactor system 10 also includes a glass matrix slab 64 positioned adjacent the floor 66 of PCV 22 and a plurality of heat pipes or heat tubes 68 at least partially embedded in glass matrix slab 64 and extending into the area 70 under PCV 12.

Glass matrix slab 64 is fabricated from any suitable glass. Preferably, the glass becomes molten at low temperatures to avoid overheating of PCV 22, and has low viscosity and a high thermal expansion coefficient to create powerful convective mixing currents for rapid dissolution of core 14 debris and the transport of heat. Additionally, the glass should be able to dissolve all of core 14 debris. In one embodiment, a lead borate glass containing lead oxide and boron oxide is used for glass matrix slab 64. Specifically, the lead borate glass includes at least 2 moles of lead oxide per mole of boron oxide.

Traditional glasses are oxide mixtures that are capable of dissolving oxides but not metals. To eliminate reactive metals in core 14 debris, a sacrificial metal oxide such as lead oxide is included in the glass. The lead oxide oxidizes the reactive metals generating metal oxides and lead as a by-product. The oxidized products of reactive metals, such as zirconium oxide, can be dissolved into the glass matrix. Of course, other sacrificial metal oxides may be used besides lead oxide.

Figure 2:
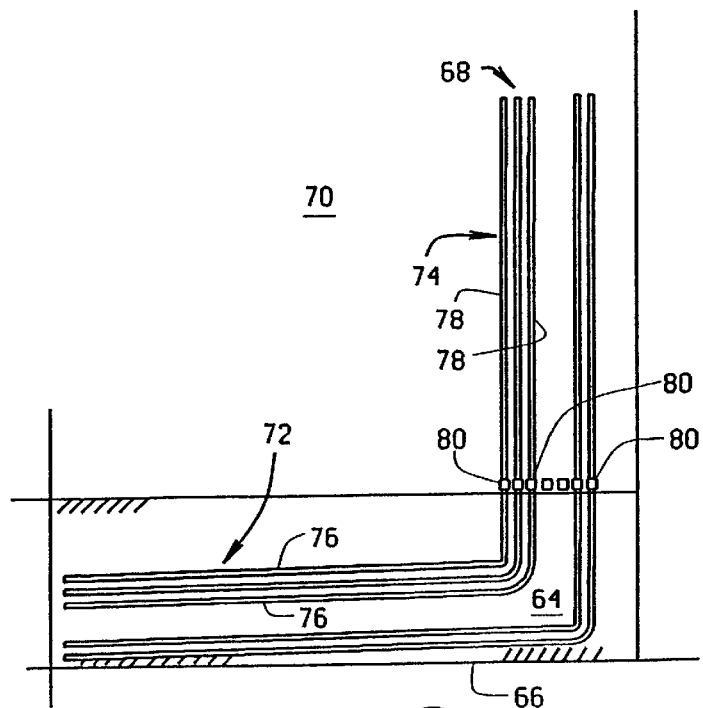
FIG. 2 is a schematic side view, with parts cut away, of the nuclear reactor system shown in FIG. 1.

Referring to FIG. 2, each heat pipe or heat tube 68 includes an evaporator portion 72 and a condenser portion 74. Each evaporator portion 72 includes a cylindrical evaporator tube 76 and each condenser portion 74 includes a cylindrical condenser tube 78. Header pipes 80 connect a plurality of evaporator tubes 76 to a plurality of condenser tubes 78 so that the evaporator tubes 76 are in flow communication with the condenser tubes 78.

At least a portion of each evaporator tube 76 is positioned parallel to containment floor 66 and embedded in glass matrix slab 64. One end of each evaporator tube 76 extends through glass matrix slab 64 into drywell area 70 under RPV 12 and couples with a header pipe 80. Also, evaporator tubes 76 can be located at various distances from containment floor 66.

Evaporator tubes 76 are fabricated from materials that are capable of withstanding high temperatures of approximately 2000° C., for example, tungsten and molybdenum. Condenser tubes 74 are also fabricated from heat resistant materials, but can be fabricated from stainless steel.

Figure 3:
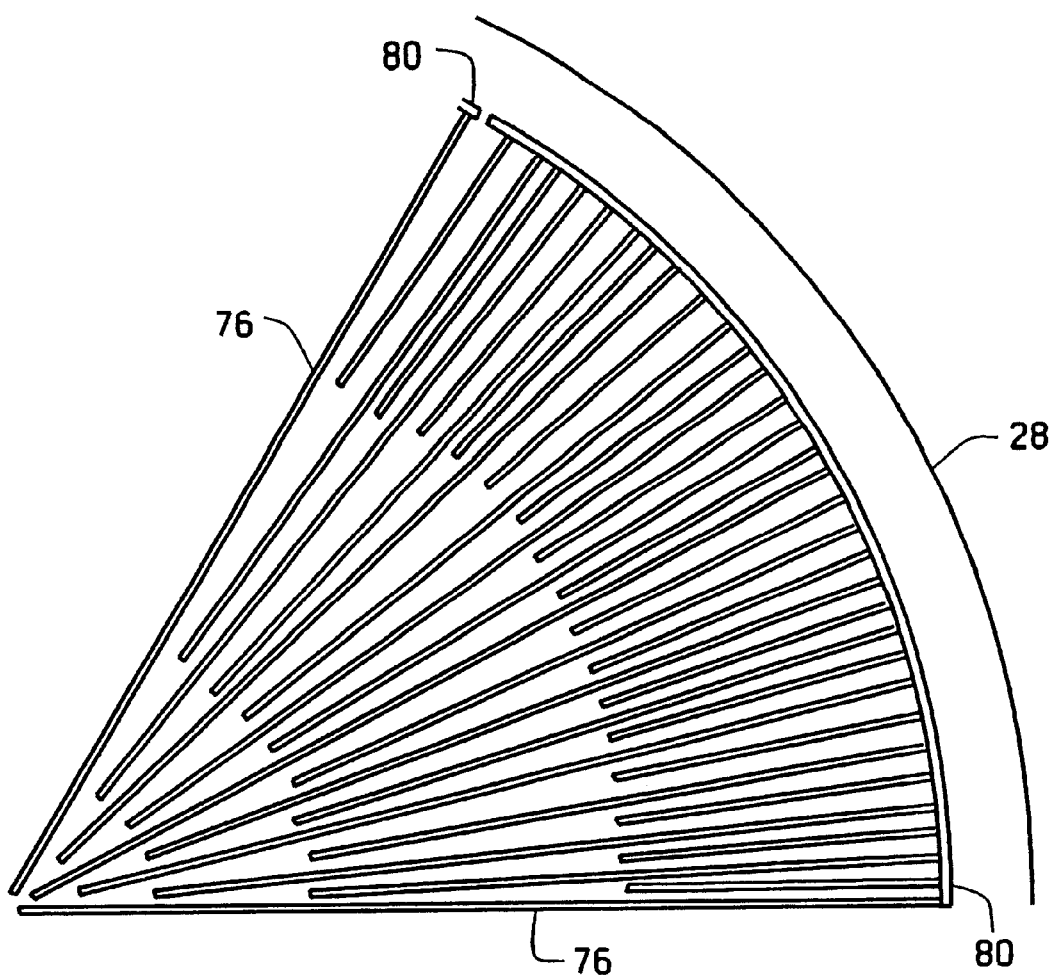
FIG. 3 is a schematic top view, with parts cut away, of the nuclear reactor system shown in FIG. 1.

Referring to FIG. 3, Header pipes 80 extend around the perimeter of area 70 under PCV 12 adjacent to wall 28. In the embodiment illustrated in FIG. 3, each header pipe 80 extends partially around the perimeter of area 70 forming an arc. A plurality of evaporator tubes 76 extend from a header pipe 80 toward the center of area 70 forming a fan like configuration. Additionally, evaporator tubes 76 extending from header pipe 80 are of varying lengths. FIG. 3 illustrates an arrangement of alternating long, short, and intermediate length of evaporator tubes 76. In alternate embodiments, other arrangements of varying lengths of evaporator tubes 76 can be used, or all evaporator tubes 76 can be of the same length.

In the unlikely event of a severe accident where the molten core 14 penetrates lower head 20 of reactor vessel 12, molten core 14 debris will fall onto glass matrix slab 64. Glass matrix slab 64 softens and the uranium and fission products mix with the glass matrix. Because of increased heat in drywell 24, the fusible valves 32 open to permit water to flow from suppression pool 30 to partially fill drywell 24 and overlie condenser tubes 78. Evaporator tubes 76 embedded in glass matrix 64 transfer heat from glass matrix slab 64 to condenser portion 74 which then release the heat to the water overlying condenser tubes 78. PCCS 38 and 40 removes heat from the interior of containment 22 and releases the heat to the environment outside containment 22. As the temperature inside containment 22 decreases, glass matrix slab 64 re-solidifies, thus maintaining the integrity of the containment boundary.

The above described heat removal system 82 which includes glass matrix slab 64, heat tubes 68, and PCCS 38 and 40, provides protection for PCV 22 of nuclear reactor 10 from attack by molten core 14 debris in the unlikely event of a severe accident where molten core 14 penetrates lower head 20 of RPV 12. Particularly, Glass matrix slab 64 provides protection to floor 66 of PCV 22 from attack by molten core 14 debris. Also, heat tubes 68 and PCCS 38 and 40 further provide protection for PCV 22 by cooling molten core 14 debris to prevent a breach of the containment boundary.

While the invention has been described and illustrated in terms of various specific embodiments, those skilled in the art will recognize that the invention can be practiced with modification within the spirit and scope of the claims.

What is claimed is:

1. A heat removal system for the under vessel area of a nuclear reactor, the nuclear reactor comprising a reaction pressure vessel located in a primary containment, the primary containment having a floor and comprising a drywell, a suppression pool, and a passive containment cooling system, said heat removal system comprising:

a glass matrix slab positioned adjacent the containment floor; and a plurality of heat tubes, each said heat tube comprising an evaporator portion and a condenser portion, said evaporator portion comprising a cylindrical tube, at least a portion of said evaporator tube substantially parallel to the containment floor and embedded in said glass matrix slab, one end of said evaporator tube extending through said glass matrix slab and into the area below the reactor pressure vessel, said condenser portion comprising a cylindrical tube in flow communications with said evaporator tube and extending away from the containment floor in the area below the reactor pressure vessel.

2. A heat removal system in accordance with claim 1 further comprising a plurality of header pipes, each said header pipe coupled to and in flow communication with at least one evaporator tube and at least one condenser tube.

3. A heat removal system in accordance with claim 2 wherein said plurality of header pipes are located around the perimeter of the containment floor.

4. A heat removal system in accordance with claim 3 wherein each said header pipe is configured to extend around a portion of the perimeter of the containment floor.

5. A heat removal system in accordance with claim 4 wherein each said header pipe forms an arc of a circle.

6. A heat removal system in accordance with claim 5 wherein said evaporator tubes extend from said header pipes in an inverted fan pattern so that a first end of said evaporator tubes is connected to said header pipes and said second end of said evaporator tubes extend toward a point located in the center of the containment floor.

7. A heat removal system in accordance with claim 1 wherein said glass matrix slab comprises a lead borate glass.

8. A heat removal system in accordance with claim 7 wherein said lead borate glass comprises lead oxide and boron oxide.

9. A heat removal system in accordance with claim 8 wherein said lead borate glass comprises at least two moles of lead oxide per mole of boron oxide.

10. A heat removal system in accordance with claim 1 wherein said plurality of evaporator tubes comprise tungsten or molybdenum.

11. A heat removal system in accordance with claim 1 wherein said plurality of condenser tubes comprise stainless steel, tungsten, or molybdenum.

12. A heat removal system in accordance with claim 1 further comprising vent tubes configured to connect the suppression pool with the drywell.

13. A nuclear reactor system comprising:
- a primary containment vessel, said primary containment vessel having a floor and comprising a drywell and a wetwell;
- a reaction pressure vessel located in said primary containment;
- a passive containment cooling system;
- a suppression pool located in said wetwell;
- a glass matrix slab positioned adjacent said containment floor; and
- a plurality of heat tubes, each said heat tube comprising an evaporator portion and a condenser portion, said evaporator portion comprising a cylindrical tube, at least a portion of said evaporator tube substantially parallel to said containment floor and embedded in said glass matrix slab, one end of said evaporator tube extending through said glass matrix slab and into the area below the reactor pressure vessel, said condenser portion comprising a cylindrical tube in flow communications with said evaporator tube and extending away from said containment floor in the area below the reactor pressure vessel.

14. A nuclear reactor system in accordance with claim 13 further comprising a plurality of header pipes, each said header pipe coupled to and in flow communication with at least one evaporator tube and at least one condenser tube.

15. A nuclear reactor system in accordance with claim 14 wherein said plurality of header pipes are located around the perimeter of said containment floor.

16. A nuclear reactor system in accordance with claim 15 wherein each said header pipe is configured to extend around a portion of the perimeter of said containment floor.

17. A nuclear reactor system in accordance with claim 16 wherein each said header pipe forms an arc of a circle.

18. A nuclear reactor system in accordance with claim 17 wherein said evaporator tubes extend from said header pipes in an inverted fan pattern so that a first end of said evaporator tubes is connected to said header pipes and said second end of said evaporator tubes extend toward a point located in the center of said containment floor.

19. A nuclear reactor system in accordance with claim 13 wherein said glass matrix slab comprises a lead borate glass.

20. A nuclear reactor system in accordance with claim 19 wherein said lead borate glass comprises lead oxide and boron oxide.

21. A nuclear reactor system in accordance with claim 20 wherein said lead borate glass comprises at least two moles of lead oxide per mole of boron oxide.

22. A nuclear reactor system in accordance with claim 13 wherein said plurality of evaporator tubes comprise tungsten or molybdenum.

23. A nuclear reactor system in accordance with claim 13 wherein said condenser tubes comprise stainless steel, tungsten, or molybdenum.

24. A nuclear reactor system in accordance with claim 13 further comprising vent tubes connecting said suppression pool with said the drywell.

* * * * *